F. G. HENGST.
CULTIVATOR.
APPLICATION FILED JULY 2, 1920.

1,417,381.

Patented May 23, 1922.
2 SHEETS—SHEET 1.

INVENTOR.
FREDRICK G. HENGST
BY
*Hazard & Miller*
ATTORNEYS.

F. G. HENGST.
CULTIVATOR.
APPLICATION FILED JULY 2, 1920.

1,417,381.

Patented May 23, 1922.
2 SHEETS—SHEET 2.

INVENTOR.
FREDRICK G. HENGST
BY
Hazard & Miller
ATTORNEYS.

UNITED STATES PATENT OFFICE.

FREDRICK G. HENGST, OF COVINA, CALIFORNIA.

CULTIVATOR.

1,417,381.  Specification of Letters Patent.  Patented May 23, 1922.

Application filed July 2, 1920. Serial No. 393,548.

*To all whom it may concern:*

Be it known that I, FREDRICK G. HENGST, a citizen of the United States, residing at Covina, in the county of Los Angeles and State of California, have invented new and useful Improvements in Cultivators, of which the following is a specification.

This invention relates to agricultural implements, and more particularly to that class of implements known as cultivators, and the like, and the prime object of the invention lies in the provision of a simple and efficient means for actuating the cultivator teeth to bring them into engagement with, or disengagement from the ground.

My device is particularly adapted for use in connection with tractors, wherein the operator is usually seated upon the tractor, remote from the implement, and wherein the implement may be effectually operated, from the driver's seat thereof.

A further object is the provision of a mechanism whereby the draft means may be used as a force to raise the cultivator teeth and obviates the necessity of an operator riding upon a cultivator, or using physical force for actuating it. A mechanism is provided wherein such traction force is used to raise the teeth from engagement with the ground, and by releasing the holding mechanism, the force of gravity causes a lowering of the cultivating elements.

These and other objects of my invention will be more fully set forth in the following specification, wherein I have illustrated the preferred form of my device, and wherein.

Figure 1:
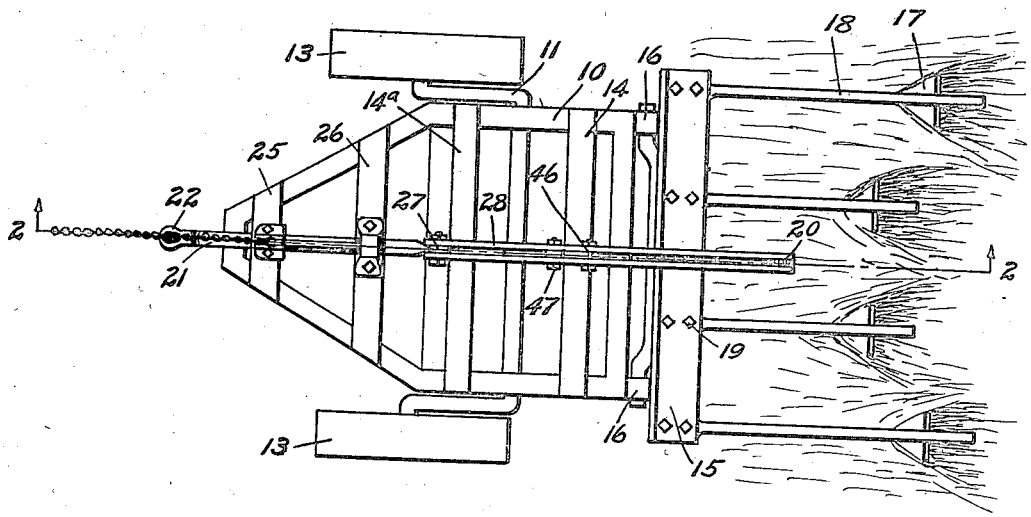
Fig. 1 is a plan view of the cultivator.

In the following specification my device will be described in its particular adaptability for use in connection with a cultivator, but it is to be understood that my novel mechanism may be used in connection with, or upon, any of the many agricultural implements, such as plows, harrows, hay racks, and the like, wherein its adaptability may be of use. The present day use of tractors of various kinds and descriptions, in connection with agricultural work, such as plowing, harrowing, cultivating and the like, is very well known; and, in the types now commonly in use the driver is generally seated upon the vehicle at the rear thereof, from which point he manipulates the various levers and steering gear for operating the tractor. As hereinbefore stated, one of the principal objects of my invention is to provide a mechanism for cultivators, or the like, embodying means which can be effectually operated from a seat of the tractor, to raise and lower the ground engaging elements, as for instance when it is desired to turn around at the ends of the rows, or for raising such elements from engagement with the ground for purpose of transporting the implements along a road or across fields.

Referring now to the drawings, the numeral 10 designates a frame, constructed of any suitable material such as angle iron, and is preferably of the configuration shown, although such details may be altered to suit individual requirements. The frame 10 is supported on a crank axle 11, pivotally journalled in bearings 12, and having traction wheels 13 on its outer ends. Suitable cross braces 14 and 14$^a$ may be provided for giving rigidity to the frame.

Figure 2:
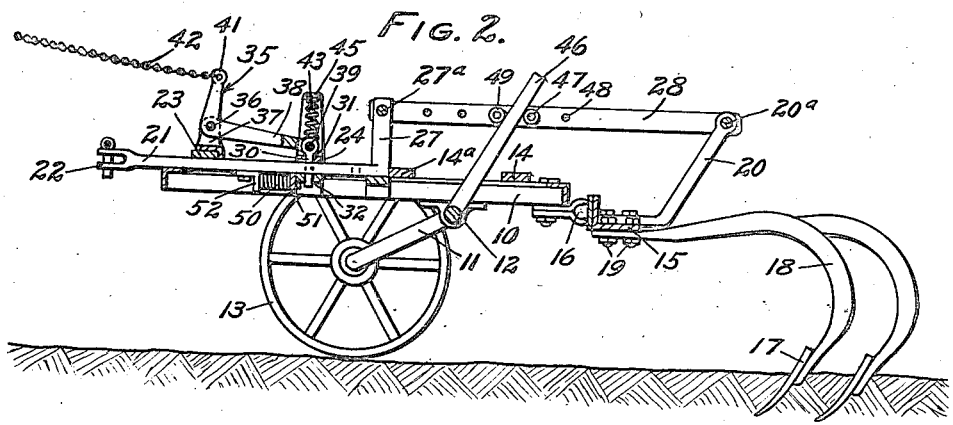
Fig. 2 is a central sectional elevation taken on line 2—2 of Fig. 1, showing the teeth lowered and in operative engagement with the ground.
Figure 3:
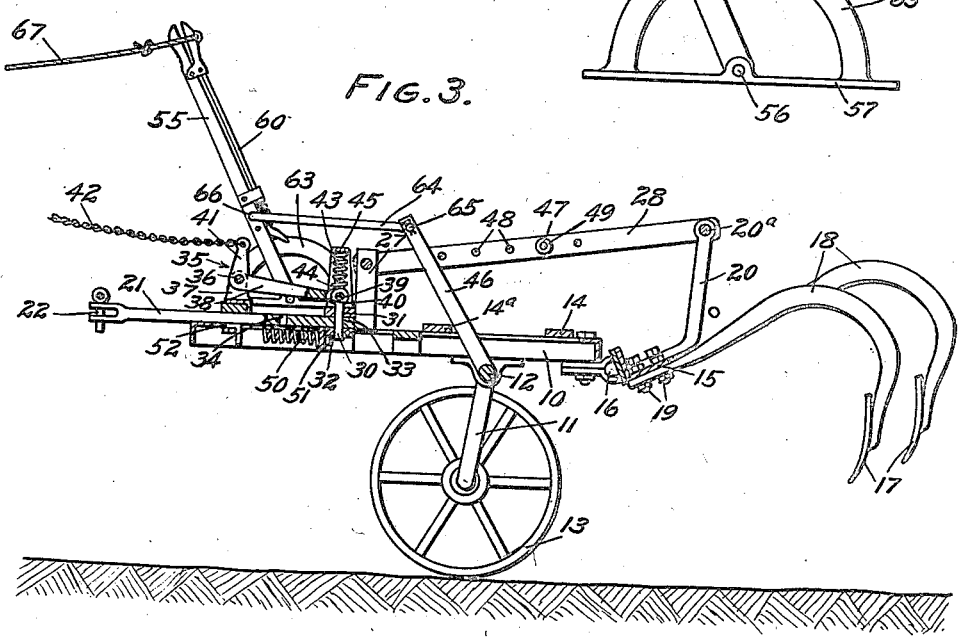
Fig. 3 is a similar view to that shown in Fig. 2, showing teeth in their raised or disengaged position.

A transverse bar 15 is pivotally mounted on the rear of the frame 10 by means of hinges 16, and is adapted to swing, as shown in the drawing, Figs. 2 and 3, to cause engagement of the shovels 17, mounted on drag bars 18, with the ground, or disengagement therefrom. The members 17 and 18 will be hereinafter referred to as the cultivator teeth although it is to be understood that any other form of implements, such as disk-harrows, furrowing tools, hay rakes, or the like, may be substituted in their place, without departing from the spirit of my invention. The drag bars 18 may be secured to the bar 15 by any suitable means, such as bolts 19. An actuating arm 20 is rigidly secured to the bar 15 and extends upwardly therefrom, as shown in Figs. 2 and 3.

A draw bar 21, has a clevis 22 of the usual type, on its forward end, for attaching the usual draft rigging, which in this case is contemplated to be the tractor above mentioned. The draw bar 21 is longitudinally slidable in bearings formed by clamps 23 and 24 extending over it and securing it to the transverse brace members 25 and 26, respectively, of the frame 10. An arm 27, preferably formed integral with the draw bar 21, extends upwardly from its rear end at substantially right angles thereto.

A connecting rod 28, suitably constructed of two parallel members, or a single piece of material bent U-shaped, links the arms 27 at 27ª with the tooth actuating arm 20, at 20ª.

The forward and rearward movements of the draw bar 21 are limited by stops, consisting of the clamp 24, against which the arm 27 will strike to limit the forward movement, and the transverse brace 14ª, acting as the stop against which the bar 21 abuts to limit its rearward movement. A suitable locking mechanism to lock the draw bar 21 in either its forward or rearward position, which will be more fully hereinafter explained, consists of a detent 30 extending through an aperture 31 in the clamp 24, and engaging a similar aperture 32, in the transverse member 26 of the frame. To engage these apertures the detent passes through apertures 33 and 34 in the draw bar 21. The detent 30 may be actuated in its engagement and disengagement with the apertures 33 and 34 of the draw bar 21 through the medium of a bell crank 35 pivoted at 36 in a suitable bearing 37, mounted on the frame 10; one arm 38 engaging the detent 30, through the medium of a pin 39 and slot 40; the arm 41 having an actuating chain or cable 42, secured to it, for actuating the mechanism from the seat of the tractor. The detent 30 is normally held in engagement with the members as hereinbefore stated through the medium of an expansion spring 43, confined between the seat 44, on the top of the detent, and a member 45 extending thereover. In this manner the detent is always held in normal engagement with the aperture 31, in the clamp 24, and in a position to readily engage either one or the other of apertures 33 or 34, in the draw bar 21, when either of them registers therewith by forward or rearward movement of this member.

An upwardly extending arm 46, rigidly secured to the crank axle 11, is adapted to be actuated by the connecting rod 28, for raising and lowering the frame 10 with reference to the ground surface, as will be more fully hereinafter set forth. Bolts 47 extending through apertures 48, in the connecting rod 28, carry anti-friction rollers 49 which engage the actuating arm 46. A plurality of these holes 48 are provided in the connecting rod 28 for adjusting the arc through which the lever 46 is thrown during movement of the connecting rod 28, and which in turn causes an adjustment of the raising and lowering of the frame 10, with reference to the surface of the ground. Any suitable means may be provided for limiting the throw of the arm 46, which in this case is shown to be the transverse brace members 14 and 14ª. The brace 14 limits the rearward movement of the crank 46, when it has not been previously limited by the bolt 47 in the connecting rod 28, as indicated in the drawings, and more particularly in Fig. 2. It is desired to have the forward throw of the arm 46 so limited that the lower ends of the crank axle, upon which the wheels are mounted, will extend slightly forward of a line drawn vertically through the axle bearings, in order that the axle may always be off center and in a position to be thrown forward by the weight of the frame and cultivator teeth, through the medium of the connecting rod 28, when the draw bar is released from its forward position.

In order to cushion the shock between the drawbar 21 and the transverse brace 14ª, resulting from the rearward pull on the arm 27 by the levers 20 and 46, when the detent 30 is withdrawn from the position shown in Fig. 3, a suitable spring 50 is provided on the frame, being mounted on a cross member 51, and adapted to be compressed by a block 52, secured to the underside of the draw bar 21, when that member moves rearwardly.

Figure 4:
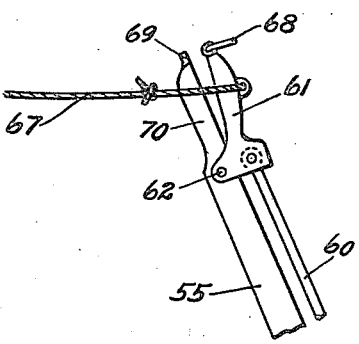
Fig. 4 is an enlarged fragmentary detail showing the manner of actuating the lever grip from a place remote therefrom.
Figure 5:
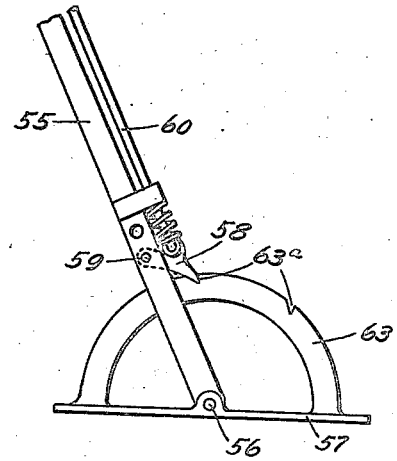
Fig. 5 is an enlarged fragmentary detail of the lever shown in Fig. 3.

When it is desired to actuate the crank axle 11, independently of the other moving elements, to raise or lower the frame 10 with reference to the ground level; or when it is desired to allow the frame lever to remain set at all times, with the reference to the raising and lowering of the teeth, a lever 55 is provided, as shown in Fig. 3, pivotally mounted at 56 on a bracket 57 rigidly secured to the frame 10, and having thereon a pawl 58 pivoted at 59, and manually operable through the medium of connecting a rod 60 and hand grip 61, likewise pivoted at 62, the pawl 58 is adapted to co-operate with a segment 63, having notches 63ª, likewise rigidly secured to the frame. A connecting rod 64 connects the lever 55 with the crank axle actuating lever 46, being pivoted thereto at 65, and to the lever 55 at 66. Referring to Fig. 4, the hand grip 61 is shown to be operatively connectable to the driver's seat of the tractor (not shown) through the medium of a rope or cable 67; however, any other suitable means may be used.

In the practical operation of my improved cultivator, it is secured to the tractor, or other draft means, through the medium of the clevis 22 on the forward end of the draw bar 21. Assuming the elements 17 and 18 to be in working engagement with the ground, as shown in Fig. 2, upon coming to the end of the field, or other place where it is desired to turn, the driver merely pulls on the chain or cable 42, withdrawing the detent 30 from engagement with the perforation 34 of the draw bar 21, which leaves that member free to move. The traction of the wheels 13 will naturally resist forward movement of the vehicle as a whole and the pull of the tractor on the draw bar through the medium of arm 27, connecting rod 28 and arm 20, will raise the drag bars 18 upwardly to the position shown in Fig. 3, at the same time raising the frame 10 also upwardly through engagement of the rollers 49, on the connecting rod 28, with the arm 46. When the draw bar has reached its farthermost forward position as shown in Fig. 3, the spring 43 will force the detent 30 downwardly into the aperture 33 locking the elements in that position. After turning the vehicle around and coming into position for further work, it is only necessary for the driver to pull on the cable 42, withdrawing the detent from the aperture 33, and the weight of the frame 10 together with the elements secured to the transverse bar 15 will cause the draw bar 21 to be drawn rearwardly to the position shown in Fig. 2, which in turn will cause a rearward movement of the arm 46, and again bring the members back into position as shown in Fig. 2.

When the cultivator is being moved a considerable distance in inoperative position, it may be desired to relieve the axle of unnecessary twisting movements due to the crank arm being in an inclined position. Thus it is seen that by removing the forward roller 49, the crank arm 11 can be thrown in a more vertical position and the desired result is thereby accomplished.

In cases where the weight of the frame, and the various elements mounted thereon, are too heavy to raise against slight traction, such for instance as on smooth roads, or the like, the lever 55 is provided to manually assist the raising of the elements by relieving the weight, transmitted to the connecting rod 28 through the arm 46. In case it is desired to use lever 55 as such a medium or to have it ready for such uses the pawl 58 may be locked out of engagement with the notch 63ª, of segment 63, by a link 68 on the grip 61, engaging a lug 69 on the handle 70.

While I have herein illustrated and described the preferred form of my device it is understood that I reserve the right to make any necessary and convenient changes in the construction thereof which may come within the scope of the appended claims.

I claim:

1. In a device of the character described, the combination of a frame having traction supporting members, said supporting members having means for elevating cultivator teeth, said cultivator teeth pivotally mounted on said frame, a draw bar supported by said frame, and means whereby said draw bar dependently changes the angularity of said teeth and actuates said supporting members.

2. In a device of the character described, comprising a frame, a crank axle supported on said frame, cultivator teeth pivotally mounted on said frame, a draw bar, means whereby said draw bar dependently actuates said crank axle and teeth, so as to change the angularity of said teeth and to elevate the same.

3. In a device of the character described, comprising a frame, a crank axle supported by said frame, cultivator teeth pivotally mounted on said frame, a draw bar slidably mounted on said frame, actuating means connected to said teeth, and to said crank axle, a second means connecting said teeth actuating means and draw bar, said crank means engaging said second means so that when said draw bar is actuated the angularity of said teeth is changed and the same elevated.

4. In a device of the character described the combination of a frame supported on a crank axle, traction wheels on the axle, a transverse tooth supporting bar pivotally mounted on the rear of the frame and having an actuating arm, a draw bar having an upwardly extending arm slidably mounted on the front of the frame, a connecting rod linking the draw bar arm with the tooth actuating arm, a detent for locking the draw bar in forward or rearward position, means for actuating said detent and an upwardly extending arm rigidly secured to the crank axle and adapted to operatively engage the connecting rod.

5. In a device of the character described the combination of a frame supported on a crank axle, traction wheels on the axle, a transverse tooth supporting bar pivotally mounted on the rear of the frame and having an upwardly extending actuating arm, a draw bar slidably mounted on the front of the frame having an upwardly extending arm, a connecting rod linking the draw bar and the tooth actuating arms, an upwardly extending arm rigidly secured to the crank axle and adapted to be actuated by the connecting rod to raise and lower the frame with reference to the ground level, detent means to lock the draw bar in forward or rearward position, means to actuate the detent means and means to actuate the crank axle independently of the other means.

In testimony whereof I have signed my name to this specification.

FREDRICK G. HENGST.